US012602946B2

(12) United States Patent
Hillborg

(10) Patent No.: US 12,602,946 B2
(45) Date of Patent: Apr. 14, 2026

(54) DOCUMENT CLASSIFICATION USING UNSUPERVISED TEXT ANALYSIS WITH CONCEPT EXTRACTION

(71) Applicant: INTERNATIONAL BUSINESS MACHINES CORPORATION, Armonk, NY (US)

(72) Inventor: Mikael Hillborg, Umeå (SE)

(73) Assignee: International Business Machines Corporation, Armonk, NY (US)

( * ) Notice: Subject to any disclaimer, the term of this patent is extended or adjusted under 35 U.S.C. 154(b) by 290 days.

(21) Appl. No.: 18/464,620

(22) Filed: Sep. 11, 2023

(65) Prior Publication Data

US 2025/0087009 A1 Mar. 13, 2025

(51) Int. Cl.
| | |
|---|---|
| *G06V 30/413* | (2022.01) |
| *G06F 40/258* | (2020.01) |
| *G06V 30/19* | (2022.01) |

(52) U.S. Cl.
CPC .......... *G06V 30/413* (2022.01); *G06F 40/258* (2020.01); *G06V 30/19093* (2022.01)

(58) Field of Classification Search
CPC ............ G06V 30/413; G06V 30/19093; G06F 40/258
See application file for complete search history.

(56) References Cited

U.S. PATENT DOCUMENTS

| | | | |
|---|---|---|---|
| 7,065,514 B2 * | 6/2006 | Yang-Stephens | ....... G06F 16/38 707/999.102 |
| 8,132,103 B1 * | 3/2012 | Chowdhury | ........ G06F 16/7834 715/725 |

(Continued)

FOREIGN PATENT DOCUMENTS

| | | |
|---|---|---|
| KR | 101983752 B1 | 5/2019 |
| KR | 20220108924 A | 8/2022 |
| WO | 2016099019 A1 | 6/2016 |

OTHER PUBLICATIONS

Suzanne "using multi-terminology indexing for the assignment of MeSH descriptors to health resources in a French online catalogue" (Year: 2008).*

(Continued)

*Primary Examiner* — Solomon G Bezuayehu
(74) *Attorney, Agent, or Firm* — Elliot J. Shine

(57) ABSTRACT

An embodiment for classifying documents using unsupervised text analysis with concept extraction. The embodiment may obtain a generic description for a document by: extracting concepts from headings and descriptions of a target document using natural language processing, matching the extracted concepts to generic abstracts obtained from an abstract database, where the abstract database is independent and separate from the target document, and processing the generic abstracts to lemmatize words and remove common words to form the generic description. The embodiment may process an available series of technical classifications. The embodiment may perform bidirectional analysis to determine a most relevant technical classification for the target document based on the generic description for the target document. The embodiment may assign the most relevant technical classification to the target document.

20 Claims, 5 Drawing Sheets

(56) References Cited

U.S. PATENT DOCUMENTS

| | | | | |
|---|---|---|---|---|
| 8,645,389 B2* | 2/2014 | Oliver | G06F 16/355 | 707/723 |
| 8,843,536 B1* | 9/2014 | Elbaz | G06F 16/9566 | 705/26.1 |
| 8,903,825 B2* | 12/2014 | Parker | G06F 16/355 | 707/E17.089 |
| 9,201,957 B2* | 12/2015 | Turdakov | G06F 16/367 | |
| 9,235,812 B2* | 1/2016 | Scholtes | G06N 20/00 | |
| 10,896,292 B1* | 1/2021 | Norton | G06V 30/12 | |
| 11,887,731 B1* | 1/2024 | Gallagher | G06V 30/413 | |
| 2002/0138529 A1* | 9/2002 | Yang-Stephens | G06F 16/38 | 707/E17.09 |
| 2004/0019601 A1* | 1/2004 | Gates | G06F 16/355 | 707/999.102 |
| 2007/0198506 A1* | 8/2007 | Attaran Rezaei | G06F 16/367 | 707/999.005 |
| 2008/0154875 A1* | 6/2008 | Morscher | G06F 16/353 | 707/999.005 |
| 2008/0208840 A1* | 8/2008 | Zhang | G06F 40/295 | 707/999.005 |
| 2008/0273220 A1* | 11/2008 | Couchman | H04N 1/00968 | 358/1.15 |
| 2013/0013603 A1* | 1/2013 | Parker | G06F 16/353 | 707/E17.046 |
| 2014/0108005 A1* | 4/2014 | Kassis | G06F 40/211 | 704/9 |
| 2016/0132648 A1* | 5/2016 | Shah | G16H 70/20 | 705/2 |
| 2016/0217126 A1* | 7/2016 | Kannan | G06F 16/353 | |
| 2018/0182381 A1* | 6/2018 | Singh | G06F 16/9537 | |
| 2022/0182253 A1* | 6/2022 | Pawar | G06Q 10/1093 | |
| 2024/0289407 A1* | 8/2024 | Rofouei | G06F 16/9577 | |

OTHER PUBLICATIONS

Gayathri, et al., "Ontology based Concept Extraction and Classification of Ayurvedic Documents", ELSEVIER, ScienceDirect Procedia Computer Science 172, 2020, pp. 511-516.

Rabiger, et al., "Context-based Extraction of Concepts from Unstructured Textual Documents", Elsevier, 2021, pp. 1-23. https://www.sciencedirect.com/science/article/abs/pii/S0020025521012779?via%3Dihub.

Li, et al., "Bag-of-Concepts representation for document classification based on automatic knowledge acquisition from probabilistic knowledge base", Elsevier, 2020, 47 Pages.

Litvak, et al., "Classification of Web Documents Using Concept Extraction from Ontologies", Springer-Verlag Berlin Hedelberg, 2007, pp. 287-292.

Gu, et al., "Hierarchical document classification based on concept and context", International Journal of Digital Content Technology and its Applications, Jan. 2011, 2 Pages (Abstract only).

* cited by examiner

100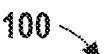

COMPUTER 101

PROCESSOR SET 110

PROCESSING CIRCUITRY 120    CACHE 121

COMMUNICATION FABRIC 111

VOLATILE MEMORY 112

PERSISTENT STORAGE 113

OPERATING SYSTEM 122

DOCUMENT CLASSIFICATION PROGRAM 150

PERIPHERAL DEVICE SET 114

UI DEVICE SET 123    STORAGE 124    IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141    HOST PHYSICAL MACHINE SET 142

VIRTUAL MACHINE SET 143    CONTAINER SET 144

Figure 1

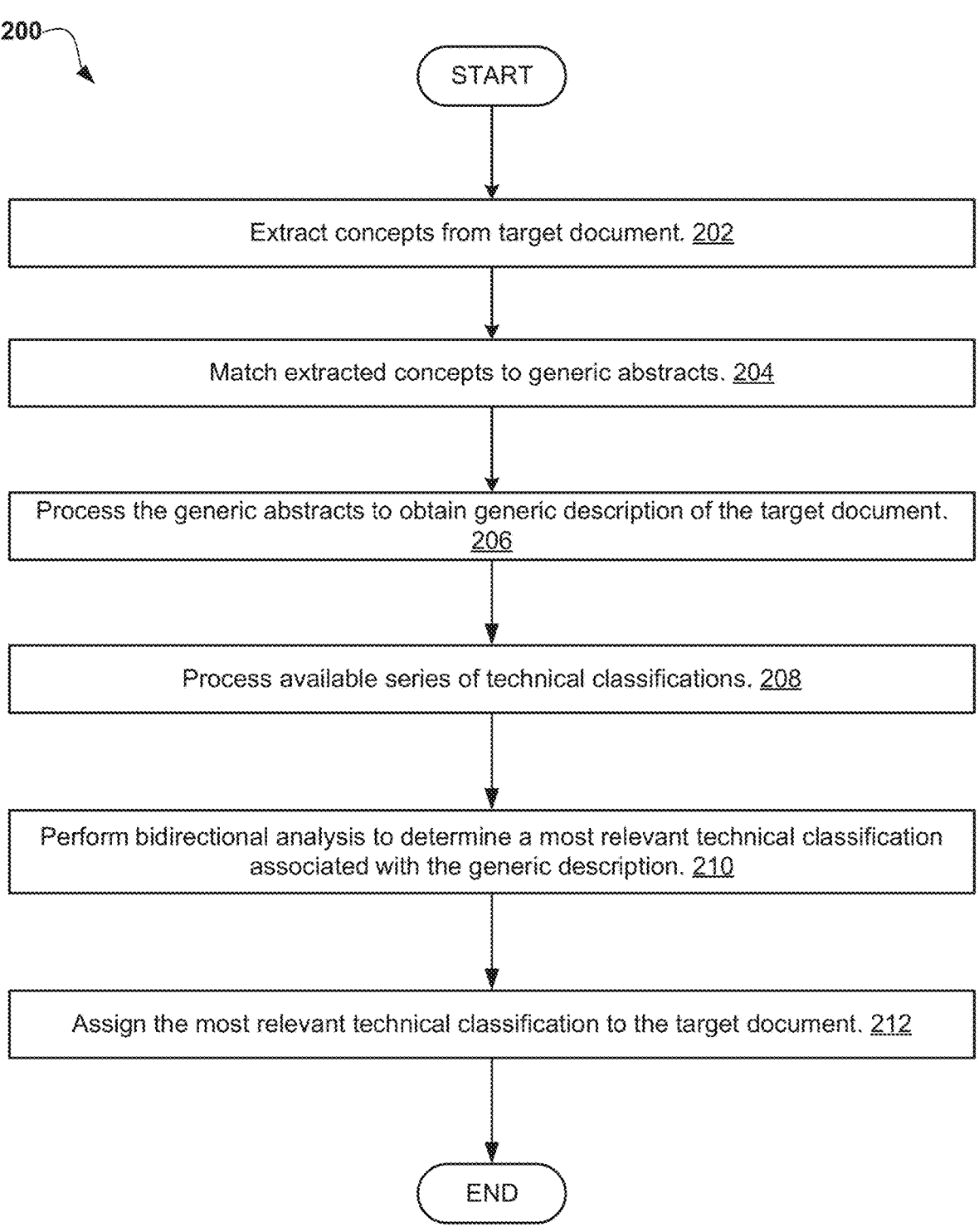

200

START

Extract concepts from target document. 202

Match extracted concepts to generic abstracts. 204

Process the generic abstracts to obtain generic description of the target document. 206

Process available series of technical classifications. 208

Perform bidirectional analysis to determine a most relevant technical classification associated with the generic description. 210

Assign the most relevant technical classification to the target document. 212

END

Figure 2

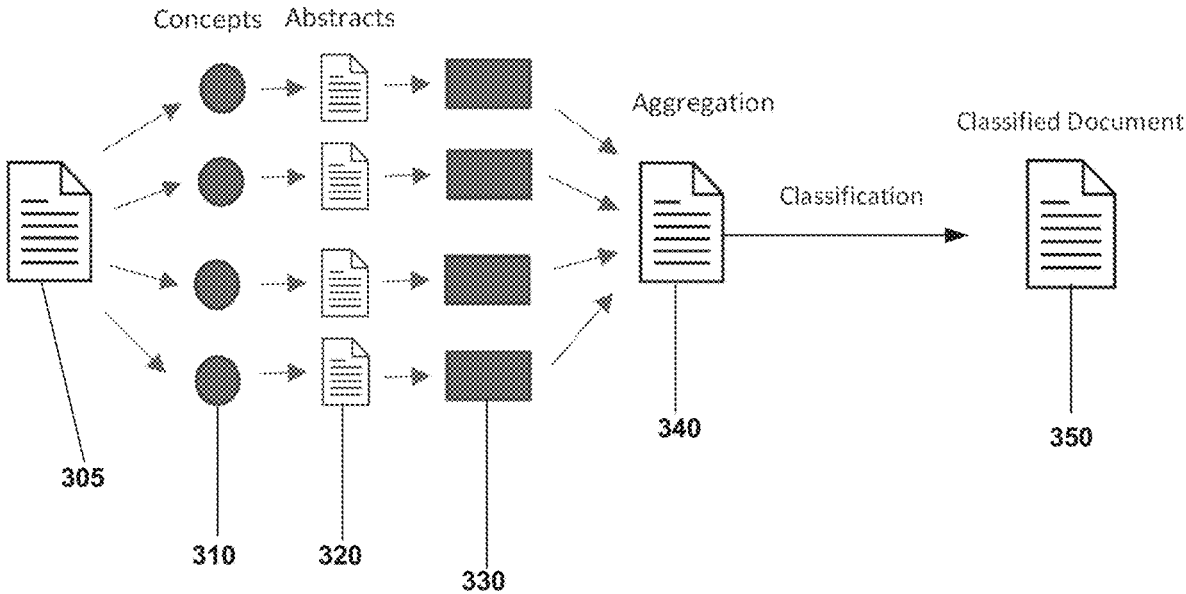
Figure 3

DOCUMENT CLASSIFICATION USING UNSUPERVISED TEXT ANALYSIS WITH CONCEPT EXTRACTION

BACKGROUND

The present application relates generally to computer processing, and more particularly, to classifying documents using unsupervised text analysis with concept extraction.

Document classification is a common practice across a variety of industries and businesses. Some businesses may, for example, classify a given document so that it may be tracked, organized, stored, shared, distributed, or otherwise handled properly in a most appropriate environment and with the most appropriate personnel. To promote maximum efficiency and minimize costs, many businesses strive to ensure that their document classification is both accurate and efficient.

SUMMARY

According to one embodiment, a method, computer system, and computer program product for improved classifying of documents using unsupervised text analysis with concept extraction is provided. The embodiment may include obtaining a generic description for a target document, wherein obtaining the generic description includes extracting concepts from headings and descriptions of the target document using natural language processing (NLP), matching the extracted concepts to generic abstracts obtained from an abstract database, where the abstract database is independent and separate from the target document, and processing the generic abstracts to lemmatize words and remove common words to form the generic description. The embodiment may also include processing an available series of technical classifications. The embodiment may also include performing bidirectional analysis to determine a most relevant technical classification for the target document based on the generic description for the target document. The embodiment may also include assigning a most relevant technical classification to the target document.

BRIEF DESCRIPTION OF THE SEVERAL VIEWS OF THE DRAWINGS

These and other objects, features and advantages of the present disclosure will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 1 illustrates an exemplary networked computer environment according to at least one embodiment;

FIG. 2 illustrates an operational flowchart for an exemplary process of classifying documents using unsupervised text analysis with concept extraction according to at least one embodiment;

FIG. 3 depicts a diagrammatic view of an exemplary process of obtaining a generic description for a target document according to at least one embodiment;

DETAILED DESCRIPTION

Figure 4:
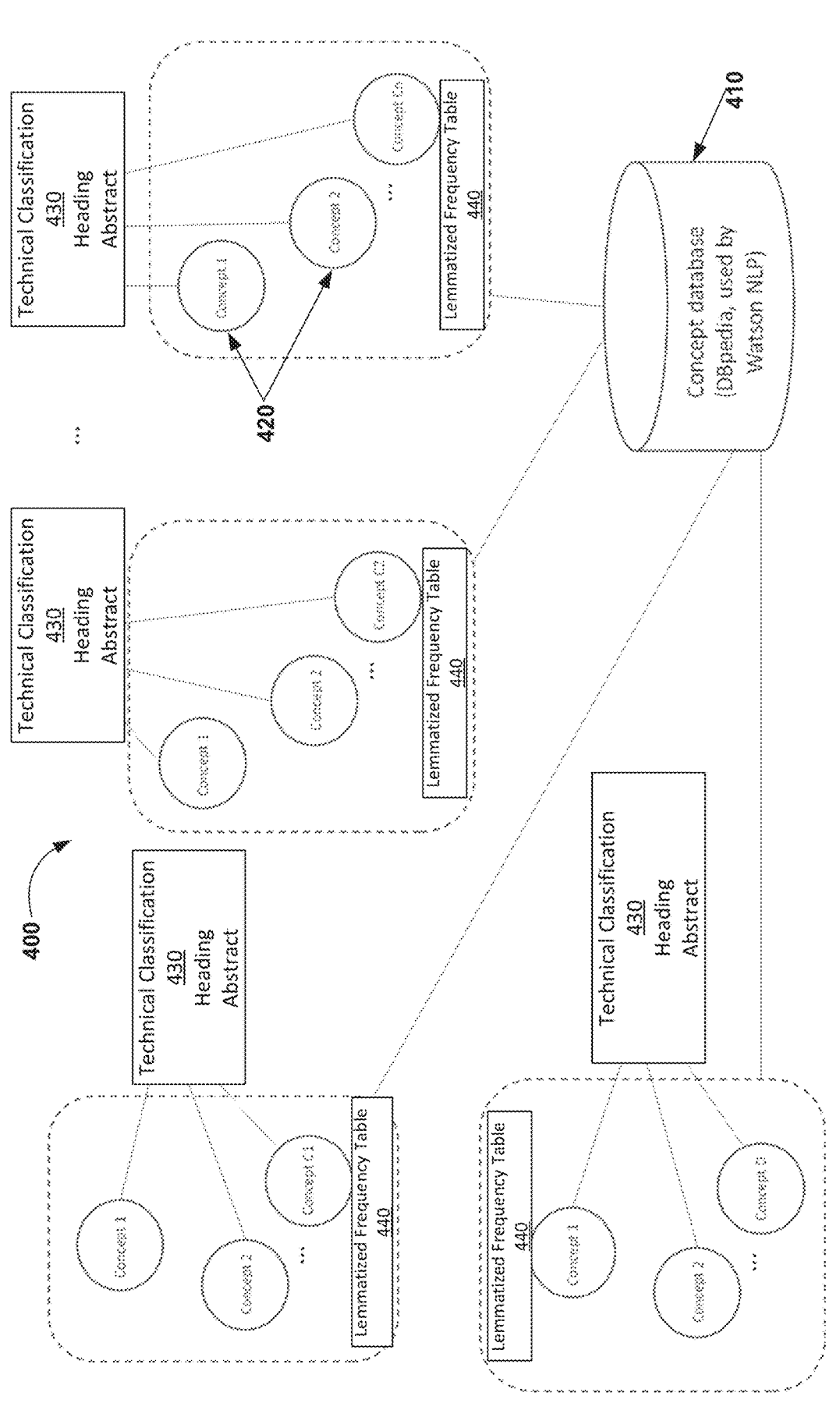
FIG. 4 depicts a diagrammatic view of lemmatized frequency tables corresponding to a series of technical classifications and a target document generatable by described embodiments employing concept extraction and lemmatization according to at least one embodiment.

Detailed embodiments of the claimed structures and methods are disclosed herein; however, it can be understood that the disclosed embodiments are merely illustrative of the claimed structures and methods that may be embodied in various forms. The present disclosure may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present application relate generally to computer processing, and more particularly, to classifying documents using unsupervised text analysis with concept extraction. The following described exemplary embodiments provide a system, method, and program product to, among other things, obtain a generic description for a target document, wherein obtaining the generic description includes: extracting concepts from headings and descriptions of the target document using natural language processing (NLP), matching the extracted concepts to generic abstracts obtained from an abstract database, where the abstract database is independent and separate from the target document, and processing the generic abstracts to lemmatize words and remove common words to form the generic description. The following described exemplary systems, methods, and program products may then process available series of technical classifications, perform bidirectional analysis to determine a most relevant technical classification for the target document based on the generic description for the target document, and assign a most relevant technical classification to the target document.

As previously described, document classification is a common practice across a variety of industries and businesses. Some businesses may, for example, classify a given document so that it may be tracked, organized, stored, shared, distributed, or otherwise handled properly in a most appropriate environment and with the most appropriate personnel. To promote maximum efficiency and minimize costs, many businesses strive to ensure that their document classification is both accurate and efficient.

However, there are many challenges related to document classification. Costs associated with incorrectly classifying documents may result in significant costs and negative externalities which may demand investing additional time, personnel, or other resources to remedying the mistake. In addition, many document classification systems may rely upon large training datasets which may require significant time or resource investment to obtain. Additionally, many traditional methods that leverage machine learning and deep learning to classify documents without a training set, struggle to maintain high levels of accuracy and reliability. In some cases, such as for example, classifying documents based on technical classification, inaccurate classifications in unsupervised settings may occur because the document classification systems attempt to process the entire document and descriptions included therein. This could result in an incorrect or inappropriate technical classification being assigned to a document, which may subsequently lead to mishandling of the document as it is shared or distributed to the incorrect team or personnel.

Accordingly, a method, computer system, and computer program product for improved classifying of documents using unsupervised text analysis with concept extraction would be advantageous. The method, system, and computer program product may obtain a generic description for a target document, wherein obtaining the generic description includes: extracting concepts from headings and descriptions of the target document using natural language processing, matching the extracted concepts to generic abstracts obtained from an abstract database, where the abstract database is independent and separate from the target document, and processing the generic abstracts to lemmatize words and remove common words to form the generic description. The method, system, computer program product may process an available series of technical classifications. The method, system, computer program product may then perform bidirectional analysis to determine a most relevant technical classification for the target document based on the generic description for the target document. Thereafter, the method, system, computer program product may assign a most relevant technical classification to the target document. In turn, the method, system, computer program product has provided for improved classifying of documents using unsupervised text analysis by leveraging concept extraction to extract multiple concepts from a target document. Described embodiments process and aggregate the extracted concepts to form a representation (generic description) of the original document based on a database of abstracts without including any of the description or body of the target document. The representation of the target document is then analyzed using a bidirectional (cross) analysis to determine a most relevant technical classification for the target document based on the generic description, derived from the extracted concepts, for the target document as compared to representations of associated technical classifications. Described embodiments there provide an advantageous method for performing hierarchical document classification in an unsupervised setting without leveraging entire descriptions of documents which may lead to inaccurate technical classifications.

The present invention may be a system, a method, and/or a computer program product at any possible technical detail level of integration. The computer program product may include a computer readable storage medium (or media) having computer readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring now to FIG. 1, computing environment 100 contains an example of an environment for the execution of at least some of the computer code involved in performing the inventive methods, such as document classification program/code 150. In addition to document classification code 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and document classification code 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in document classification code 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in document classification program 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to the present embodiment, the document classification program 150 may be a program capable of obtaining a generic description for a target document, wherein obtaining the generic description includes: extracting concepts from headings and descriptions of the target document using natural language processing, matching the extracted concepts to generic abstracts obtained from an abstract database, where the abstract database is independent and separate from the document, and processing the generic abstracts to lemmatize words and remove common words to form the generic description. Document classification program 150 may then process an available series of technical classifications. Next, document classification program 150 may perform bidirectional analysis to determine a most relevant technical classification for the document based on the generic description for the document. Thereafter, document classification program 150 may assign a most relevant technical classification to the document. In turn, document classification program 150 has provided for improved classifying of documents using unsupervised text analysis by leveraging concept extraction to extract multiple concepts from a target document. Described embodiments process and aggregate the extracted concepts to form a representation (generic description) of the original document based on a database of abstracts without including any of the description or body of the target document. The representation of the target document is then analyzed using a bidirectional (cross) analysis to determine a most relevant technical classification for the target document based on the generic description, derived from the extracted concepts, for the target document as compared to representations of associated technical classifications. Described embodiments therefore provide an advantageous method for performing hierarchical document classification in an unsupervised setting without leveraging entire descriptions of documents which may lead to inaccurate technical classifications.

Referring now to FIG. 2, an operational flowchart for an illustrative process 200 of classifying documents using unsupervised text analysis with concept extraction according to at least one embodiment is provided.

Steps 202, 204, and 206 of illustrative process 200 are each related to obtaining a generic description for a target document that will be classified by document classification program 150. At 202, document classification program 150 may first extract concepts from headings and descriptions of the target document using natural language processing (NLP). To accomplish this document classification program 150 may leverage any number of suitable large language models. Accordingly, the extracted concepts may relate to any concepts or abstract idea which may be technical or non-technical in substance.

Next at 204, document classification program 150 may match the extracted concepts to generic abstracts obtained from an abstract database. The abstract database including the generic abstracts is separate and independent from the target document. This property will functionally, when compared to traditional classification methods, reduce bias and increase accuracy when associating the concepts in the target document with potential technical classifications because the ground truths relied upon is provided by a separate independent source.

At 206, document classification program 150 may process the generic abstracts to lemmatize words and remove common words to form the generic description. To accomplish this, document classification program 150 may utilize any suitable dictionary of common non-technical words. The words contained in the dictionary of common non-technical words may then be removed from the target document headings and the generic abstracts that match the extracted concepts from the target document. The remaining language (from these processed abstracts) is aggregated and makes up an obtained generic description of the target document. In embodiments, document classification program 150 may then generate a word frequency table associated with the generic description of the target document.

FIG. 3 depicts a diagrammatic view of an exemplary process 300 of obtaining a generic description for a target document according to at least one embodiment using similar methods as have been described above. In FIG. 3, target document 305 is to be classified by document classification program 150. Document classification program 150 then leverages large language models and natural language processing techniques to extract concepts 310 from the target document 305. Document classification program 150 then identifies abstracts 320 from an accessible database (not shown) of generic abstracts that are associated with extracted concepts 310. Document classification program 150 may then process the abstracts at 320 by lemmatizing and removing common non-technical words to obtain representations 330 of abstracts 320. Document classification program 150 may then aggregate representations 330 to obtain aggregation 340 which corresponds to the generic description of the target document described above. Document classification program 150 may then leverage the aggregation 340 (generic description) to determine a most relevant technical classification by performing bidirectional cross analysis techniques to determine which technical classifications have the most word matches. Document classification program 150 may then assign classification to the classified target document at 350. The process of determining the most-relevant technical classification will be explained in greater detail below in connection with the description of steps 208-212.

Next at 208, document classification program 150 may process an available series of technical classifications. The available series of technical classifications may be predetermined and provided by the business or entity employing document classification program 150, or may be derived from a publicly available source for technical codes or classifications that may be assigned to documents.

In embodiments, document classification program 150 may be configured to process each available technical classifications or technical codes in a similar, though slightly modified, manner to the processing of the target documents and associated abstracts as was described in steps 202, 204, and 206 respectively. For example, document classification program 150 may identify a series of relevant technical classifications for an exemplary target document 'D1' that includes an exemplary technical classification 'T1' that may be processed, using known natural language processing techniques, to isolate a hierarchical tree structure including 3 separate level descriptions: '12-12 Infrastructure and Hardware', '1107-1107 Edge Computing and Networking' and '110102-110102 Networking Services and Routing'. Document classification program 150 may then concatenate the level descriptions to obtain the following: "Infrastructure and Hardware Edge Computing and Networking Services and Routing". As was described above for processing the generic abstracts, document classification program 150 may then remove common non-technical words (as well as, in embodiments, lower case words, special characters, and duplicate words) to obtain the following: "infrastructure hardware edge computing networking services routing". Lastly, after lemmatization, document authentication program 150 would obtain a final processed version of the technical code as follows: "infrastructure hardware edge compute network service route", which may functionally serve as a generic technical classification for purposes of cross analysis with the extracted concepts from steps 202-206. In embodiments, document classification program may then generate lemmatized frequency tables for the technical classifications.

FIG. 4 depicts a diagrammatic view of an exemplary method or system 400 of processing an available series of technical classifications according to at least one embodiment. In FIG. 4, an exemplary concept database 410 is leveraged to extract concepts 420 associated with a series of available technical classifications 430. Lemmatized frequency tables 440 may then be generated for each of technical classifications 430.

At 210, document classification program 150 may perform bidirectional analysis to determine a most relevant technical classification for the target document based on the generic description for the document. For example, if document classification program 150 was attempting to assign a classification to an exemplary target document 'D1' from a predetermined list of 100 available classifications, then document classification program 150 may determine how closely associated each technical classification is with the generic description of the target document by matching how many instances of matching words may exist between level descriptions associated with each technical classifications and the generic description (aggregated description) of the target document.

Figure 5:
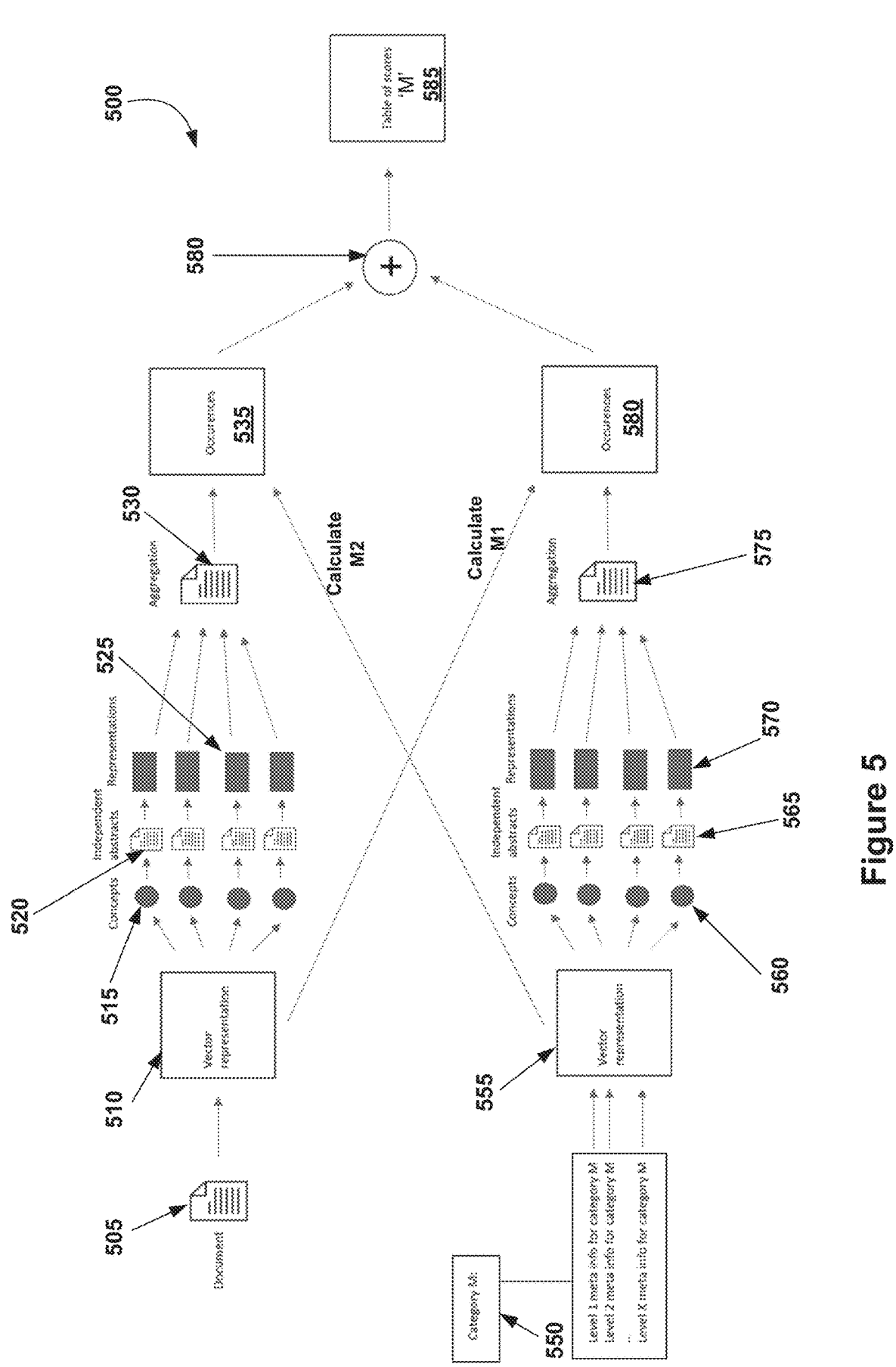
FIG. 5 depicts a diagrammatic view of an exemplary process of classifying documents using unsupervised text analysis with concept extraction according to at least one embodiment.

FIG. 5 depicts a diagrammatic view of an exemplary process of classifying documents using unsupervised text analysis with concept extraction according to at least one embodiment. Specifically, FIG. 5 illustrates the process 500 of performing bidirectional analysis to generate a table of scores that may be leveraged to assign a most-relevant classification to a given target document. In FIG. 5, a target document 505 is processed according to illustrative process 200 described above. Vector representations 510 of the target document are leveraged to extract concepts 515, which are then used to obtain independent abstracts 520. Lemmatization and removal of common words from abstracts 520 are then performed to obtain representations 525 which are aggregated to obtain aggregation 530 which serves as a generic description of the target document. A word frequency table (not shown) may then be generated for aggregation 530 which may be used to determine number of occurrences 535 of various words in aggregation 530. A similar process, as described above, is then performed for each technical classification (represented as individual categories 'M') in the predetermined set of technical classifications (M, M-I, M-II, . . . . M-N). In FIG. 5, an individual technical classification, 'Category M' is shown at 550. Vector representations 555 of the technical classification 550 are leveraged to extract concepts 560, which are then used to obtain independent abstracts 565. Lemmatization and removal of common words from abstracts 565 are then performed to obtain representations 570 which are aggregated to obtain aggregation 575 which serves as an aggregate description of the technical classification. The aggregate descriptions of each of the classifications may include tree structures of each technical classification (category) which include independent level descriptions. A word frequency table (not shown) may then be generated for aggregation 575 which may be used to determine number of occurrences 580 of various words in aggregation 575 based on a bidirectional cross analysis (described below) of the generic description of the target document and the level descriptions of each the available technical classifications within aggregation 575.

In embodiments, as shown in FIG. 5, bidirectional cross analysis of the generic description of the target document and the level descriptions (within aggregations 575) of the available technical classifications may be performed to generate a table of scores corresponding to occurrences of matching words across the aggregate or generic representations (aggregation 530 and 575) of both the target document and the level descriptions of the technical classifications. In embodiments, for example, document classification program 150 may perform the bidirectional cross analysis using the following exemplary steps: For each exemplary technical code or classification 'T', where "T.heading" is the concatenated and the processed heading: Let 'V1' be an empty vector, and then for each word W{n} in the processed heading of the generic description: count the number of occurrences of W{n} in "T.heading" and extend V1 with the count: M1:=sum of V1. Let V2 be an empty vector. Then, for each word T{n} in the processed heading of the technical code or classification (Category M): count the number of occurrences of "T.heading" in W and extend V2 with the count. M2:=sum of V2, and let M:=M1+M2. Accordingly, after performing this bidirectional/cross analysis (V1/V2), document classification program 150 may identify a technical classification or code associated with a highest value of M.

In FIG. 5, the above-described steps for the bidirectional cross analysis are shown as arrows 'Calculate M1' and 'Calculate M2'. For example, at the arrow corresponding to 'Calculate M1', representing a process of calculating 'M1' described above, each word in the heading (words in a title, for example) associated with target document 505 may be leveraged to identify instances of word matches in aggregation 575 associated with a given technical classification represented as 'Category M'. A second arrow, 'Calculate M2' in FIG. 5, represents a process of calculating 'M2' by leveraging each level description within the tree structure associated with each technical classification (Category) to identify instances of word matches in aggregation 530 associated with the target document 505. At 580, the values of 'M1' and 'M2' for each technical classification or category may be summed together to obtain a calculated score ('M') stored within a table of scores 585.

Thereafter at 212, document classification program 150 may assign a most relevant technical classification to the target document. In embodiments, a most relevant technical classification corresponds to the technical classification which, after bidirectional/cross analysis (V1/V2) as described above, has the highest calculated score ('M') indicating a highest volume of word matches and a highest association between the level descriptions of a given technical classification when compared to the generic description of the target document. Accordingly, at this step, document classification program 150 will assign the most relevant, highest-scoring technical classification to the target document.

It may be appreciated that document classification program 150 has thus provided for improved classifying of documents using unsupervised text analysis by leveraging concept extraction to extract multiple concepts from a target document. Described embodiments process and aggregate the extracted concepts to form a representation (generic description) of the original document based on a database of abstracts without including any of the description or body of the target document. The representation of the target document is then analyzed using a bidirectional (cross) analysis to determine a most relevant technical classification for the target document based on the generic description, derived from the extracted concepts, for the target document as compared to representations of associated technical classifications. Described embodiments therefore provide an advantageous method for performing hierarchical document classification in an unsupervised setting without leveraging entire descriptions of documents which may lead to inaccurate technical classifications.

It may be appreciated that FIGS. 2-5 provide only illustrations of an exemplary implementation and does not imply any limitations with regard to how different embodiments may be implemented. Many modifications to the depicted environment may be made based on design and implementation requirements.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method for document classification, the method comprising:
    obtaining a generic description for a target document, wherein obtaining the generic description comprises:
        extracting concepts from headings and descriptions of the target document using natural language processing;
        matching the extracted concepts to generic abstracts obtained from an abstract database, where the abstract database is independent and separate from the target document;
        processing the generic abstracts to lemmatize words and remove common words to form the generic description;

processing an available series of technical classifications;

performing bidirectional analysis to determine a most relevant technical classification for the target document based on the generic description for the target document by summing occurrences of corresponding words within the generic description for the target document and aggregate descriptions of each of the technical classifications in the available series of technical classifications and calculating scores for each of the technical classifications in the available series of technical classifications based on the sum of occurrences; and assigning the most relevant technical classification to the target document, wherein the most relevant technical classification corresponds to the technical classification with a highest calculated score, wherein the highest calculated score corresponds to a highest volume of word matches and a highest association between level descriptions of the technical classifications in the available series of technical classifications as compared to the generic description of the target document.

2. The computer-based method of claim 1, further comprising:

generating a word frequency table associated with the obtained generic description of the target document.

3. The computer-based method of claim 1, further comprising:

concatenating the level descriptions within a tree structure corresponding to each of the technical classifications in the available series of technical classifications;

further processing each of the technical classifications in the available series of technical classifications by lemmatizing the words and removing common non-technical words to obtain aggregate descriptions; and generating word tables for each of the aggregate descriptions of each of the technical classifications in the available series of technical classifications.

4. The computer-based method of claim 1, wherein the extracted concepts from headings and descriptions of the target document are obtained using multiple large language models, and wherein at least a portion of the extracted concepts are abstract and non-technical in substance.

5. The computer-based method of claim 1, wherein the available series of technical classifications is derived from an available set of generic technical classifications.

6. A computer system, the computer system comprising:

one or more processors, one or more computer-readable memories, one or more computer-readable tangible storage medium, and program instructions stored on at least one of the one or more computer-readable tangible storage medium for execution by at least one of the one or more processors via at least one of the one or more computer-readable memories, wherein the computer system is capable of performing a method comprising:

obtaining a generic description for a target document, wherein obtaining the generic description comprises:

extracting concepts from headings and descriptions of the target document using natural language processing;

matching the extracted concepts to generic abstracts obtained from an abstract database, where the abstract database is independent and separate from the target document;

processing the generic abstracts to lemmatize words and remove common words to form the generic description;

processing an available series of technical classifications;

performing bidirectional analysis to determine a most relevant technical classification for the target document based on the generic description for the target document by summing occurrences of corresponding words within the generic description for the target document and aggregate descriptions of each of the technical classifications in the available series of technical classifications and calculating scores for each of the technical classifications in the available series of technical classifications based on the sum of occurrences; and assigning the most relevant technical classification to the target document, wherein the most relevant technical classification corresponds to the technical classification with a highest calculated score, wherein the highest calculated score corresponds to a highest volume of word matches and a highest association between level descriptions of the technical classifications in the available series of technical classifications as compared to the generic description of the target document.

7. The computer system of claim 6, further comprising:

generating a word frequency table associated with the obtained generic description of the target document.

8. The computer system of claim 6, further comprising:

concatenating the level descriptions within a tree structure corresponding to each of the technical classifications in the available series of technical classifications;

further processing each of the technical classifications in the available series of technical classifications by lemmatizing the words and removing common non-technical words to obtain aggregate descriptions; and generating word frequency tables for each of the aggregate descriptions of each of the technical classifications in the available series of technical classifications.

9. The computer system of claim 6, wherein the extracted concepts from headings and descriptions of the target document are obtained using multiple large language models, and wherein at least a portion of the extracted concepts are abstract and non-technical in substance.

10. The computer system of claim 6, wherein the available series of technical classifications is derived from an available set of generic technical classifications.

11. A computer program product comprising:

one or more computer-readable storage media;

program instructions stored on the one or more computer-readable storage media to perform operations comprising:

obtaining a generic description for a target document, wherein obtaining the generic description comprises:

extracting concepts from headings and descriptions of the target document using natural language processing;

matching the extracted concepts to generic abstracts obtained from an abstract database, where the abstract database is independent and separate from the target document;

processing the generic abstracts to lemmatize words and remove common words to form the generic description;

processing an available series of technical classifications;

performing bidirectional analysis to determine a most relevant technical classification for the target document based on the generic description for the target document by summing occurrences of corresponding words within the generic description for the target document and aggregate descriptions of each of the technical classifications in the available series of technical classifications and calculating scores for each of the technical classifications in the available series of technical classifications based on the sum of occurrences; and assigning the most relevant technical classification to the target document, wherein the most relevant technical classification corresponds to the technical classification with a highest calculated score, wherein the highest calculated score corresponds to a highest volume of word matches and a highest association between level descriptions of the technical classifications in the available series of technical classifications as compared to the generic description of the target document.

12. The computer program product of claim 11, further comprising:

generating a word frequency table associated with the generic description of the target document.

13. The computer program product of claim 11, further comprising:

concatenating the level descriptions within a tree structure corresponding to each of the technical classifications in the available series of technical classifications;

further processing each of the technical classifications in the available series of technical classifications by lemmatizing the words and removing common non-technical words to obtain aggregate descriptions; and generating word frequency tables for each of the aggregate descriptions of each of the technical classifications in the available series of technical classifications.

14. The computer program product of claim 11, wherein the extracted concepts from headings and descriptions of the target document are obtained using multiple large language models, and wherein at least a portion of the extracted concepts are abstract and non-technical in substance.

15. The computer program product of claim 14, wherein the available series of technical classifications is derived from an available set of generic technical classifications.

16. The computer-based method of claim 5, wherein vector representations of the technical classifications are leveraged to extract the concepts.

17. The computer-based method of claim 16, wherein the extracted concepts are utilized in obtaining independent abstracts.

18. The computer system of claim 10, wherein vector representations of the technical classifications are leveraged to extract the concepts.

19. The computer system of claim 18, wherein the extracted concepts are utilized in obtaining independent abstracts.

20. The computer program product of claim 15, wherein vector representations of the technical classifications are leveraged to extract the concepts, and wherein the extracted concepts are utilized in obtaining independent abstracts.

*     *     *     *     *